Inventors
Andrew J. Foglia
Arnold F. Stancell
Raymond James McGowan
Attorney

United States Patent Office 3,440,238
Patented Apr. 22, 1969

3,440,238
POLYMERIZATION OF OLEFINS IN A GRAVITATING BED
Andrew J. Foglia, Brooklyn, N.Y., and Arnold F. Stancell, New Brunswick, and Raymond J. McGowan, Wayne Township, Passaic County, N.J., assignors to Mobil Oil Corporation, a corporation of New York
Filed Sept. 8, 1965, Ser. No. 485,718
Int. Cl. C08f 1/06
U.S. Cl. 260—94.9
4 Claims This invention relates to the polymerization of olefins to solid linear polymers, in the presence of solid polymerization catalysts. It is more particularly concerned with a novel continuous process for carrying out the polymerization of olefins in the presence of solid polymerization catalysts.

As is well known to those familiar with the art, many processes have been proposed to polymerize 1-olefins to crystalline polymers in the presence of stereospecific catalysts. As the process is exothermic, resort has been had to various means for removal of heat of reaction, such as the use of diluents or solvents, through agitation, and heat exchangers. Accordingly, relatively elaborate and expensive equipment is required.

Because of the use of agitation in prior continuous processes, whether by mechanical stirring or by fluidization by a flowing gas stream, the residence time of catalyst particles in the reactor can vary over a relatively wide range, resulting in low average catalyst productivity. Generally, continuous processes involve the use of elevated pressures. Consequently, practical reactor size is limited and catalyst residence time in the reaction zone is relatively short, i.e., a matter of hours. The resultant unit yield of polymer per unit of catalyst is so low that catalyst removal techniques must be employed, in order that the ash content of the polymer be sufficiently low.

It is the discovery of this invention that ethylene and other 1-olefins, gaseous at polymerization temperatures, can be polymerized in contact with solid polymerization catalysts under mild conditions of temperature and pressure, in a slowly gravitating bed of polymer and catalyst. Under the reaction conditions used, residence time of the catalyst is sufficiently long, a matter of days instead of hours, that the unit polymer produced per unit catalyst is sufficiently high that catalyst removal from the polymer product is not necessary.

Accordingly, it is a broad object of this invention to provide an improved process for polymerizing gaseous 1-olefins in the presence of solid polymerization catalysts. Another object is to provide a process for carrying out the polymerization of gaseous 1-olefins under conditions of mild temperature and pressure. A specific object is to provide a process for polymerizing gaseous 1-olefins in contact with a slowly gravitating bed of polymer and solid polymerization catalyst, under mild conditions of temperature and pressure, and in the absence of liquid heat removal medium. A further specific object is to provide such process carried out under conditions whereby catalyst removal from the polymer product is not required. Other objects and advantages of this invention will become apparent to those skilled in the art from the following detailed description, considered in conjunction with the drawings wherein:

In general, this invention provides a process for polymerizing a gaseous 1-olefin to solid poly-1-olefin, which comprises feeding, to the top of a gravitating bed of solid polyolefin, derived from said 1-olefin and solid polymerization catalyst, solid polymerization catalyst, and said gaseous 1-olefin; passing said gaseous 1-olefin downwardly through said gravitating bed, at an inlet temperature that is above about 100° F. but below the fusion temperature of said poly-1-olefin, at a pressure at least sufficient to overcome the pressure drop through said gravitating bed and at a flow rate sufficient to remove exothermic heat of polymerization; removing unreacted gaseous 1-olefin at a point near the bottom of said gravitating bed, cooling the gaseous 1-olefin so removed to said inlet temperature, and recycling it; and removing poly-1-olefin product and solid polymerization catalyst from the bottom of said gravitating bed.

In a preferred embodiment, the process is carried out by feeding catalyst diluted with solid poly-1-olefin, in order to minimize the possibility of solids fusion and agglomeration near the top of the gravitating bed.

Figure 1:
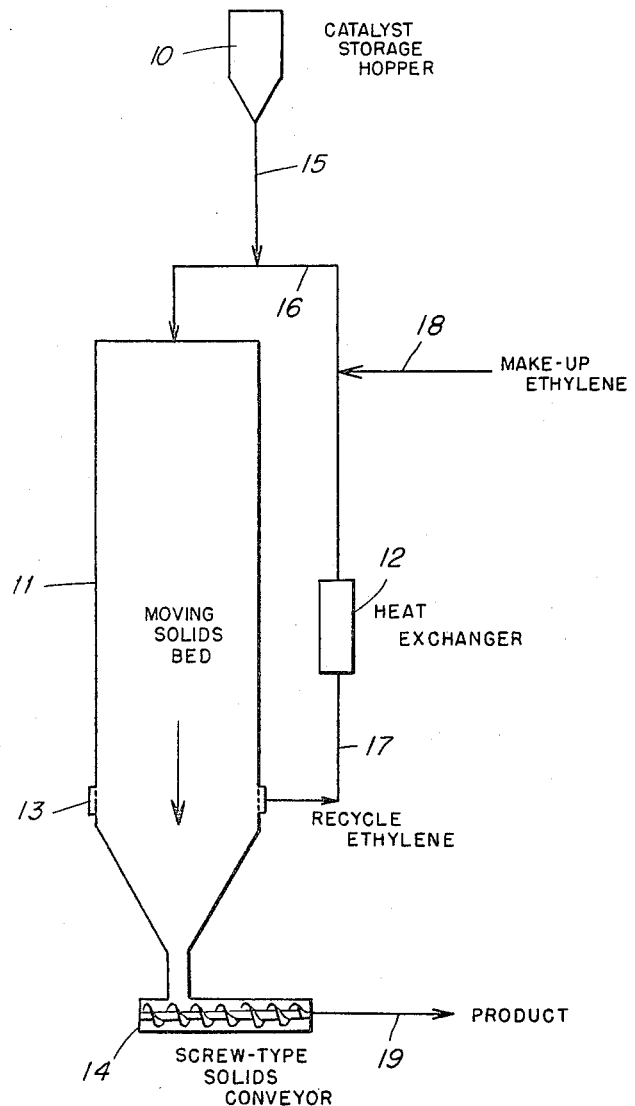
FIGURE 1 is a general flow diagram of a method for carrying out the process of this invention.
Figures 2, 3:
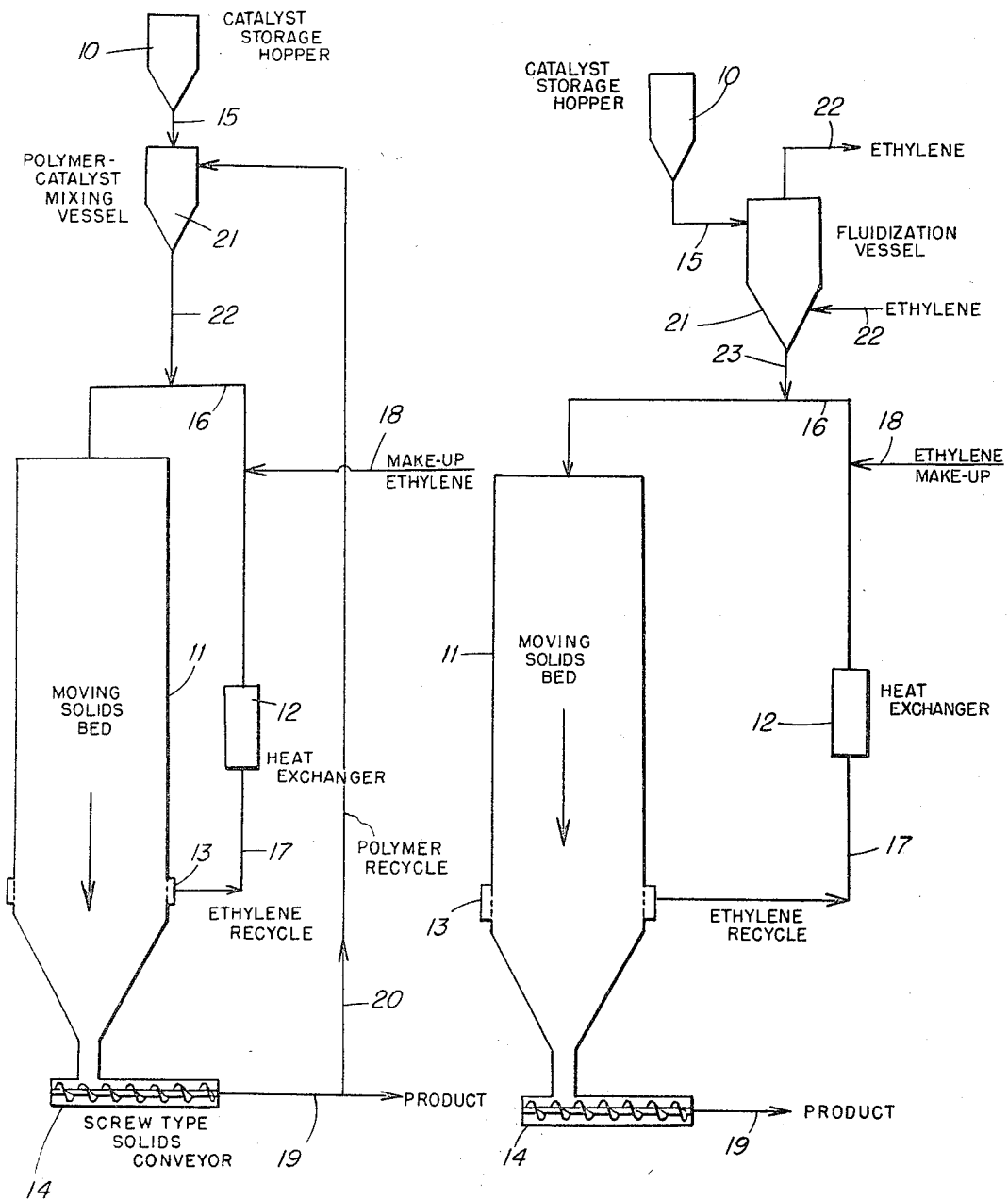
FIG. 2 is a flow diagram of a method for carrying out a preferred embodiment of the process of this invention.
FIG. 3 is a flow diagram of another method for carrying out a preferred embodiment of the process of this invention.

In the following examples, the process of this invention is illustrated by the polymerization of ethylene to solid polyethylene, with reference to FIGS. 1, 2, and 3. As mentioned hereinbefore, FIGS. 1, 2, and 3 present flow diagrams of the process and of two methods for carrying out preferred embodiments. In all cases the catalyst used was chromium oxide (about 2 wt. percent Cr) supported on silica-alumina containing about 10 weight percent $Al_2O_3$, the catalyst being in a finely divided state (40–200 mesh).

EXAMPLE 1

The basic elements of the reaction system used in this example are (FIG. 1) a catalyst storage hopper 10, a reaction vessel 11, and a heat exchanger 12. The reaction vessel 11 is provided with a vented manifold 13 or other means for disengaging gaseous material, and with a screw type solids conveyor 14 or other means for disengaging solids from the reactor, as hereinafter described. In this example, the reactor 11 is a cylindrical vessel 13.7 feet in diameter and 55 feet high. It contains a slowly gravitating bed of solid polyethylene and catalyst.

In operation, catalyst is charged from the catalyst storage hopper 10 through a line 15 into a line 16 at a rate of 0.0585 pound/hour. In the line 16 catalyst is admixed with ethylene gas, and the mixture conveyed to the top of the gravitating bed in reactor 11. The ethylene gas passes downwardly through the gravitating bed, and unreacted ethylene is removed through the vent manifold 13 and recycled through a line 17. The inlet temperature of the ethylene gas is 100° F., and the outlet temperature is 195° F., operating with an ethylene recycle rate of 150 pounds/hour per square foot gravitating bed surface area. The recycle ethylene is passed through the heat exchanger 12 where it is cooled to 100° F. and then recycled to the top of the reactor through the line 16. Make-up ethylene is introduced through a line 18 into line 16 at a rate of 585 pounds/hour. The ethylene pressure at the top of the reactor is 20 p.s.i.g., which is sufficient to overcome the pressure drop through the gravitating bed.

Polyethylene product is withdrawn from the reactor by means of the solids conveyor 14 at a rate of 585 pounds/hour. This rate is sufficient to provide a catalyst residence time in the reactor of 28 days at an average reaction rate of 15 pounds polymer per pounds catalyst per hour. This rate affords an overall productivity of 10,000 pounds polyethylene/pound of catalyst, and the catalyst residue concentraction in the polyethylene is 0.01 weight percent. The polyethylene product is discharged from the solids conveyor 14 through a line 19 into product storage.

EXAMPLE 2

This example illustrates an embodiment wherein catalyst is admixed with polyethylene before it is fed to the reactor, in order to prevent catalyst agglomeration in the upper portions of the gravitating bed. Referring specifically to FIG. 2, wherein like parts to those shown in FIG. 1 bear the same designation, a portion of the product passing through line 19 is diverted through a line 20 into a polymer-catalyst mixing vessel 21. The rate of product polyethylene withdrawal through line 20 is 2.92 pounds/hour. As in Example 1, catalyst is withdrawn from the catalyst storage hopper 10 through line 15 at a rate of 0.0585 pound/hour and fed to the polymer-catalyst mixing vessel 21.

In the polymer-catalyst mixing vessel 21 the catalyst is admixed with the polyethylene to produce a mixture having a 50:1 feed ratio of polymer to catalysts. This mixture is conveyed through a line 22 into the line 16, wherein it is admixed with ethylene gas. Other than utilizing the aforedescribed mixing of polyethylene with catalyst, the process is then carried out identically as described in Example 1.

EXAMPLE 3

In another embodiment of the present process admixture of catalyst with polyethylene is effected by prereacting the catalyst with ethylene in order to coat it with polyethylene prior to introducing it into the reactor. This is accomplished as shown in FIG. 3, where like parts shown in FIG. 1 bear the same numerical designation.

Referring to FIG. 3, catalyst is introduced from the catalyst storage hopper 10 through the line 15 into a fluidization vessel 21 at a rate of 0.0585 pound/hour. Ethylene gas is introduced into the fluidization vessel 21 through a line 22 at a rate of 300 lbs./hr. ft.$^2$. In the fluidization vessel 21 the ethylene comes into fluidized contact with the catalyst at a temperature of 100° F. and precoats the catalyst particles with a thin polyethylene layer. Unreacted ethylene is removed through a line 22.

The precoated catalyst is withdrawn from the fluidization vessel through a line 23 and passed into line 16, where it is admixed with the main ethylene stream. Other than for this, the process is carried out as is described in Example 1.

In general, the polymerization reaction can be performed at temperatures ranging from 100° F. up to the melting point of the polyolefin product, which is about 265° F. in the case of the polyethylene. It is preferred to operate at an upper temperature limit at least 50° F. and preferably about 70° F. below the melting point of the polyolefin. The upper temperature limit in the reactor is readily controlled by regulating the 1-olefin recycle. This rate in general can be between about 50 and 200 lbs./hr. per square foot of surface area.

Although the polymerization reaction can be carried out at pressures up to 500 p.s.i.g., the process of the invention is carried out at pressures between atmospheric and about 30 p.s.i.g. More preferably, the process is carried out at a pressure which is slightly more than that which is sufficient to overcome the pressure drop through the gravitating bed and to effect disengagement of the gas at the bottom of the reactor.

The process of this invention is applicable to any 1-olefin that is normally gaseous or at least gaseous at reaction temperatures. Accordingly, the process is applicable to ethylene, propylene, butene-1, n-amylene, 2-methylbutene-1, and 3,3-dimethyl-butene-1. The preferred olefins are ethylene, propylene and butene.

In general, any solid catalyst capable of converting 1-olefins into solid polymers is utilizable in the process of this invention. Typical catalysts utilizable herein are described in U.S. Patent No. 2,825,721. These in general are transition metal oxides in high valence state supported upon at least one material selected from the group consisting of silica, alumina, zirconia, and thoria. Other usable catalysts are nickel, cobalt, or nickel-cobalt mixtures supported on activated carbon and reduced molybdenum oxide supported on gamma-alumina, titania, or zirconia. Typical catalysts are described in U.S. Patents Nos. 2,658,059; 2,692,261; 2,692,295; 2,717,888; 2,717,-889; 2,692,257; 2,692,258; and 2,780,617. The solid catalysts can be promoted with promoters well known in the art.

As has been described hereinbefore, it is preferred that the catalyst be diluted with polyolefin prior to its introduction into the reactor. The ratio of product polyolefin to catalyst can range as high as 1000:1, but it is preferred to use ratios below 100:1.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for polymerizing a gaseous 1-olefin to solid poly-1-olefin, which comprises feeding, to the top of a gravitating bed of solid polyolefin, derived from said 1-olefin and solid polymerization catalyst, solid polymerization catalyst, and said gaseous 1-olefin; passing said gaseous 1-olefin downwardly through said gravitating bed, at an inlet temperature that is above about 100° F. but below the fusion temperature of said poly-1-olefin, at a pressure at least sufficient to overcome the pressure drop through said gravitating bed and at a flow rate sufficient to remove exothermic heat of polymerization; removing unreacted gaseous 1-olefin at a point near the bottom of said gravitating bed, cooling the gaseous 1-olefin so removed to said inlet temperature, and recycling it; and removing poly-1-olefin product and solid polymerization catalyst from the bottom of said gravitating bed.

2. The process defined in claim 1 wherein said 1-olefin is ethylene and said poly-1-olefin is polyethylene.

3. The process defined in claim 2 wherein the solid polymerization catalyst is chromium oxide supported on silica-alumina.

4. The process defined in claim 2 wherein polyethylene is admixed with the said solid polymerization catalyst fed to the top of the said gravitating bed.

References Cited

UNITED STATES PATENTS

| | | |
|---|---|---|
| 2,820,779 | 1/1958 | Dale. |
| 2,921,054 | 1/1960 | Kennedy. |
| 2,964,514 | 12/1960 | Fawcett. |
| 3,254,965 | 6/1966 | Ogle. |

JAMES A. SEIDLECK, *Primary Examiner.*

U.S. Cl. X.R.

260—93.7